United States Patent Office 3,453,224
Patented July 1, 1969

3,453,224
VINYLATION OF FATTY SUBSTANCES
David D. Taft, Minneapolis, Minn., assignor to Ashland Oil & Refining Company, Ashland, Ky., a corporation of Kentucky
No Drawing. Filed May 17, 1967, Ser. No. 639,037
Int. Cl. C08g 17/14, 17/16
U.S. Cl. 260—22                                    4 Claims

ABSTRACT OF THE DISCLOSURE

In abstract, this invention discloses a process for producing vinylated fatty substances such as styrenated alkyd resins, comprising the step of contacting at 320° to 450° F.: (A) an unsaturated fatty substance free of terminal unsaturation having more than 8 carbon atoms, with (B) a vinyl monomer such as styrene. A number of illustrative and comparative examples are given.

---

This invention relates to certain vinylated fatty substances and to methods for their production.

In the prior art procedures for vinylating fatty substances the fatty substance, which can be an unsaturated vegetable oil such as soybean oil or an alkyd resin, is heated in a reaction vessel at atmospheric pressure to a temperature of 235° to 315° F., whereupon a vinyl monomer and a suitable addition polymerization initiator in a solvent are added over a one to two hour period. The reaction is continued for a six to twenty hour period in order to insure complete polymerization of the vinyl monomer with the fatty substance. Since the addition polymerization initiator is consumed during the polymerization, "booster" amounts of this initiator are added during the course of the polymerization. While the above-described process has met with considerable commercial success, it is expensive because of the large amount of heat which must be added over the considerable polymerization period, as well as the large capital investment due to the considerable length of time that each reaction vessel is in use. Furthermore, because of the high viscosity of the resultant vinylated fatty substance, coating compositions employing these substances must contain a large amount of a volatile solvent in order to impart a low viscosity to the mixture. A low viscosity is necessary in order to apply the mixture by techniques such as dipping, spraying, rolling, or brushing. While these high solvent levels (low solids content) impart a low viscosity to the coating compositions, they are undesirable because (1) solvents are expensive and increase the cost of the coating composition, (2) solvents increase the bulk of the coating composition with a consequent increase in shipping costs, (3) the volatile solvent must evaporate before curing of the coating is complete, with the effect that such coating compositions having a low solids content require a longer drying time, (4) extensive ventilation is necessary in order to minimize the fire and health hazards attendant with high solvent vapor concentrations. Furthermore, vinylated fatty substances produced by the above-described prior art process are not water-soluble, a feature which has recently found high consumer acceptance in the alkyd resin market.

It is therefore an object of the present invention to provide novel vinylated fatty substances.

Another object of the present invention is to provide a process for producing vinylated fatty substances such as vinylated fatty acids, vinylated unsaturated vegetable oils, vinylated triglycerides, and vinylated alkyd resins.

A further object of the present invention is to provide a vinylated, water dispersible, alkyd resin and a method for its production.

A still further object of the present invention is to provide a coating composition comprising a vinylated alkyd resin having a low viscosity at a high solids content.

Yet another object of the present invention is to provide a highly economical, high temperature process which permits the vinylation of fatty substances such as oils or alkyd resins in a shorter time than heretofore possible.

Additional objects and advantages of the present invention will be apparent by reference to the detailed description thereof which follows.

In general, the process of the present invention for producing vinylated fatty substances comprises the step of contacting at 320° F. to 450° F.: (A) an unsaturated fatty substance free of terminal unsaturation having more than 8 carbon atoms with (B) a vinyl monomer.

Examples of the unsaturated fatty substance free of terminal unsaturation having more than 8 carbon atoms include, among others, the unsaturated fatty acids of 8 to 22 carbon atoms and their triglycerides, as well as alkyd resins comprising the reaction product of these unsaturated fatty acids or their triglycerides with a polyol and a polycarboxylic acid. Examples of unsaturated fatty acids of 8 to 22 carbon atoms include, among others, myristic acid, palmitic acid, stearic acid, palmitoleic acid, oleic acid, linoleic acid. Especially preferred are fatty acids having conjugated double bonds such as eleostearic acid. A fatty acid is said to have a conjugated unsaturation if the double bonds and single bonds alternate successively in the molecule. The triglycerides of the above-mentioned fatty acids are derived mainly from naturally occurring fats and oils, examples of which include, among others, linseed oil, safflower oil, conjugated safflower oil, dehydrated castor oil, cocoanut oil, tall oil, soybean oil, tung oil, and palm oil. The composition and synthesis of the alkyd resins which can be vinylated according to the present invention are described more completely below.

The vinyl monomers which are useful in the present invention are those heretofore found to be copolymerizable with the above-described fatty substances and, in general, are monomers having a $CH_2=C<$ group whose boiling point is above 58° F., examples of which include styrene, cyclopentadiene, vinyl toluene, acrylonitrile, acrylic acid, methacrylic acid and esters of $\alpha,\beta$-unsaturated monocarboxylic acids with mono-lower alkanols, examples of which include among others, methyl acrylate, methyl methacrylate, ethyl acrylate, methyl ethacrylate, pentyl methacrylate, butyl acrylate, 2-ethyl hexyl acrylate and isobutyl methacrylate. Others are described by J. D. Weaver, J. Am. Oil Chemists' Society, 40, No. 5, 4–5, 12 (1963).

When a vinyl monomer consisting of 5 to 100 weight percent of an $\alpha,\beta$-unsaturated carboxylic acid is employed to vinylate an alkyd resin or is employed to vinylate an oil which is then used to form an alkyd resin, and the alkyd resin so produced is further subjected to a neutralization step, the resultant composition of matter has the very desirable property of being water-dispersible. Any $\alpha,\beta$-unsaturated carboxylic acid of 3 to 20 carbon atoms can be employed. Examples of these acids include, among others, acrylic acid, methacrylic acid, itaconic acid, maleic acid, fumaric acid, as well as monoesters of dicarboxylic acids such as monomethyl itaconate and monobutyl itaconate, and diesters of tricarboxylic acids such as diethyl aconitate.

Neutralization is effected by the addition of a quantity of an organic or inorganic base sufficient to raise the pH of the resulting substance to above 7 and preferably to between 9 and 10. Examples of inorganic bases include anhydrous ammonia, ammonium hydroxide, calcium hydroxide, sodium hydroxide, and potassium hydroxide. Examples of suitable organic bases include the primary, secondary and tertiary amines. The tertiary amines are greatly preferred since the reaction of the primary and secondary amines with carboxylic acid groups in the resin results in the formation of amides. Amides, when present in cured films of these compositions, degrade in time, forming dark, undesirable, degradation products. Despite the fact that degradation products may be formed when using primary or secondary amines, they are acceptable in certain embodiments of this invention, e.g., where the alkyd resin is to be employed in a dark color. Examples of primary amines includes methylamine, ethylamine, and isopropylamine. Examples of secondary amines include dimethylamine and diethylamine. Examples of tertiary amines include, among others, trimethylamine, triethylamine, methyl diethylamine, and isopropyl methylethylamine, N-ethyl morpholine, and γ-dimethyl ethanol amine.

The reaction mixture can be maintained within the specified temperature range by the use of a solvent or more preferably pressure. Suitable solvents are those which are unreactive with the fatty substance and boil at a temperature less than the minimum reaction temperature. By the use of such solvents, an example of which is dimethyl formamide, the reaction can be conducted at atmospheric pressure. Slightly lower boiling solvents can be employed at slight elevated pressures. However because the solvent must be removed when the fatty substance is destined for subsequent solvent-free applications, the preferred method of maintaining the reaction mixture within the specified temperature range is by the use of autogenous pressure with little or no solvent. By "autogenous pressure" is meant, that pressure developed in the reaction mixture when the temperature is raised to a given level without the external application of pressure. Autogenous pressure generally exists in a sealed reactor.

The contacting of the unsaturated fatty substance and the vinyl monomer under the specified conditions can conveniently be accomplished in a batch operation by use of any appropriate sealed reactor. For large scale, continuous production, the contacting at autogenous pressure can be effected by any suitable pressure vessel provided with pumps to introduce the unsaturated fatty substance, the vinyl monomer, and any other reactants; and heating means sufficient to maintain the reaction mixture within the desired temperature range.

As previously stated, in order to assure better process control, it is preferred to first synthesize the alkyd resin by reacting the polyol, the polycarboxylic acid, and the oil, and then to vinylate the alkyd resin so produced. The alkyd resin can be produced according to procedures heretofore used in the alkyd resin art and, in general, by forming a reaction mixture of a polycarboxylic acid, a slight stoichiometric excess of a polyol, and 10 to 90 weight percent of an oil, and refluxing the reaction mixture at 360 to 560° F. under atmospheric pressure until the desired acid number is reached. The above can be preceded by an alcoholysis step. Examples of suitable polycarboxylic acids include, among others, maleic, fumaric, itaconic, phthalic, isophthalic, terephthalic, dimer esters of linoleic acid, their extant anhydrides and mixtures thereof. As is well-known in the alkyd resin art the anhydrides are preferentially employed because of the reduced amount of water evolved during their reaction. As used herein the term "acid" is meant to refer to the extant anhydrides. Examples of suitable polyols include, among others, ethylene glycol, propylene glycol, trimethylol ethane, trimethylol propane, and diethylene glycol. Higher polycarboxylic acids such as trimellitic acid can be added in minor amounts. Suitable oils are those which have been described above.

In accordance with a preferred embodiment of the process of the present invention, the alkyd resin produced as described above is then vinylated by contacting the resin at autogenous pressure such as that generated in a sealed bomb at 320° to 450° F. and preferably 375° to 400° F., for a period of time greater than one hour but in no case greater than 5 hours. The temperatures are quite critical in the practice of the present invention, for at temperatures much below 320° F. the resultant product does not have the desired properties, whereas at temperatures much above 450° F. degradation products form, reducing the yield.

Likewise, the times are critical to the present invention of a vinyl homopolymer which is incompatible with add sufficient vinyl monomer while avoiding the production of a vinyl homopolymer which is incompatible with the alkyd resin and therefore results in an undesirable two-phase, hazy system in the cured product. If the reaction is carried out for times greater than 5 hours, the viscosity of the resultant produce increases rapidly, making it unsuitable for coating applications or requiring an undesirably high volatiles content in order to reduce the viscosity. A surprising, and unexpected, feature of the present invention is the fact that the resultant product does not contain appreciable amounts of homopolymerized vinyl monomer as indicated by the clarity of the product. This is especially surprising in view of the fact that at least one vinyl monomer, styrene, tends to polymerize even at room temperature (68° F.), whereas when this monomer is added to the alkyd resin at autogenous pressure within the temperature ranges recited, it preferentially reacts with the alkyd resin, producing little if any polystyrene.

As previously stated, when 5 to 100 weight percent of the vinyl monomer consists of an $\alpha,\beta$-unsaturated acid such as acrylic acid and the vinylation step is followed by a neutralization step, the resultant vinylated alkyd resin is water-dispersible. Neutralization can be affected with the aforementioned bases at temperatures between —20° and 280° F. and preferably at room temperatures (68° F.), at atmospheric pressure or at sub- or superatmospheric pressure. At temperatures much below —20° F. the neutralization proceeds at an undesirably slow rate and at temperatures much above 280° F., the viscosity of the vinylated alkyd resin increases over a period of time.

The vinylated alkyd resins produced in accordance with the present invention have lower viscosities than those produced by the lower temperature prior art processes. In general when a coating composition comprises from 70 to 95% of a water-dispersible alkyd resin produced according to the present invention and 5 to 30% of a volatile solvent, the coating composition has a viscosity of 50 to 150 stokes. The prior art resins have a higher viscosity at equivalent solvent levels. Any of the well-known solvents can be employed, examples of which include among others, ethanol, methanol, xylene, water and 2-ethoxy ethanol.

The vinylated oils of the present invention find utility as textile lubricants, as metal cutting fluids, as room temperature, air-drying coatings, as baked coatings and as chemical precursors for the production of alkyd resins as described above and as exemplified in certain examples which follow.

The uncured vinylated alkyd resins of the present invention cure to form films having increased hardness, water-resistance, and alkali-resistance. These coatings can be used to protect ferrous and nonferrous metals from the deleterious effects of weathering and oxidation. These coatings can be used on houses, barns, automobiles, buildings, of all types of exterior materials such as stone, brick, wood, aluminum, and the like.

The invention is further illustrated by the following examples in which all parts and percentages are by weight unless otherwise specified. It is to be understood that the operative examples are illustrative of certain embodiments designed to teach those skilled in the art how to practice the invention and are not intended to limit the scope of the invention in any manner.

EXAMPLE 1

This example illustrates the synthesis of an alkyd resin termed Resin A which can be vinylated in accordance with the present invention.

Tung oil (62.5 g.), linseed oil (1912 g.), glycerine (499 g.), lithium hydroxide (.55 g.) are heated at 470° F. for one hour. The phthalic anhydride (925 g.) and xylene (90 g.) are added to the mixture, refluxed at 365° to 410° F. for 6½ hours until an acid number of 13.5 is reached. Then, maleic anhydride (3.5 g.) is added and the mixture heated at 410° F. for 30 minutes. Resin A at 70% nonvolatile content in xylene has a viscosity of G+ on a Gardner-Holdt Scale (1.5 to 2.0 stokes).

EXAMPLE 2

This example illustrates vinylation of an alkyd resin according to the present invention.

Resin A (739 g.) and xylene (52 g.) are charged to a sealable reactor fitted with a mechanical agitator and a reagent addition line. The contents of the reactor are sparged with nitrogen for two minutes and then heated to 270° F., whereupon the reactor is sealed. The reactor and its contents are further heated to 375° F., whereupon a solution of styrene (258 g.), acrylonitrile (86 g.), di-t-butyl peroxide (9.7 g.), and xylene (100 g.) are added continuously and uniformly over a period of one hour. One-half hour after completion of the aforementioned one hour period, the nonvolatile contents of the mixture in the reactor is 64.8% and the viscosity is 12.8 stokes. The reactor and its contents are held at 375° F. for one hour after completion of the monomer addition, then di-t-butyl peroxide (5.6 g.) as a "booster" is added and heating continued at 375° F. for one additional hour, thus giving a total reaction time of three hours. The reactor and its contents are then rapidly cooled to room temperature. The product, termed Resin B, has a viscosity of 61 stokes and a nonvolatile content of 68.0%, indicating 98.8% conversion of the styrene and the acrylonitrile. Resin B, when diluted with xylene to a 50% nonvolatile content, gives a viscosity of 2.5 stokes.

EXAMPLE 3

This example, which is not illustrative of the present invention, is set forth for comparison.

An alkyd resin, termed Resin C, is produced by the procedure of Example 2. The vinylation employed the same reactants. The reactants are refluxed at atmospheric pressure at a temperature of 260° to 285° F. until the styrene and the acrylonitrile are converted, which occurs after 16 hours of reaction time. Resin C has a viscosity of 9 stokes when diluted to a 50% nonvolatile content in xylene.

EXAMPLE 4

This example compares certain properties of films formed from Resin B and Resin C.

Certain tests are performed and the results thereof are recorded in Table I.

TABLE I

| Resin [1] | Sward hardness [2] (No.) | Water-resistance [3] (No.) |
|---|---|---|
| B | 18 | 8 |
| C | 16 | 8 |

[1] A 0.003" wet film of 50% nonvolatile content is applied with a doctor blade to a glass substrate and permitted to cure in air at room temperature (68° F.), 60% relative humidity, for 16 hours. The hardness and water-resistance tests are performed on this cured film.
[2] Sward hardness is a standard test for film hardness. The greater the number, the harder the film.
[3] Water-resistance is determined as follows. A 1" diameter puddle of water is placed on the surface of the film and allowed to stand ten minutes at room temperature (68° F.). The puddle is then removed with a clean, dry cloth and the underlying film surface graded as follows: 0—complete disintegration of the film; 5—some disintegration of the film; 8—the film surface exhibits some whitening; 10—no discernible effect.

EXAMPLE 5

An alkyd resin, termed Resin D, is prepared by first reacting soybean oil (485.8 g.), glycerol (63.4 g.), pentaerythritol (99 g.), dehydrated castor oil (viscosity G–H) (85.6 g.) and lithium hydroxide (0.2 g.), at 480° F. for one hour. This alcoholysis mixture is reacted with phthalic anhydride (303 g.) at 430° F. in the presence of xylene, until an acid number of 12–14 is reached. Naphtha is added until the reaction mixture has a nonvolatile content of 69.1%. This alkyd resin is termed Resin D.

EXAMPLE 6

Resin D (403 g.) at a nonvolatile content of 69.1% and naphtha are placed in a sealed reactor. A mixture of vinyl toluene (225 g.), di-t-butyl peroxide (5.7 g.), and naphtha (30.5 g.) are added to the sealed reactor as described in Example 1, continuously and uniformly over a period of 45 minutes. Fifteen minutes after the end of the aforementioned period and again at 45 minutes after the end of the aforementioned period, additional portions of di-t-butyl peroxide (0.7 g.) are added to the reaction mixture. After an additional 15 minutes (total reaction time 1¾ hours) the reaction mixture is rapidly cooled to room temperature. The nonvolatile content of the reaction mixture containing Resin E is 48.3%, indicating 97% conversion of the vinyl toluene. The viscosity is H on the Gardner-Holdt Scale. Certain tests are conducted on the curing and the cured film and their results are recorded in Table II.

EXAMPLE 7

This example, which is not illustrative of the present invention, is set forth for comparison.

An alkyd resin, termed Resin F, is synthesized employing the same reactants and conditions as that employed in Example 6, with the single exception that the reaction mixture is refluxed at atmospheric pressure for 10 hours in order to achieve 97% conversion of the vinyl toluene. Certain tests are conducted on a cured and curing film containing Resin F, and the results thereof are recorded in Table II.

TABLE II

| Resin [1] | Sward [2] hardness (No.) | Water [3] resistance (No.) | Alkali [4] resistance (No.) | Curing time [5] (500 gm. Zapon) (minutes) |
|---|---|---|---|---|
| E | 34 | 8 | 5 | 20 |
| F | 30 | 8 | 5 | 22 |

[1], [2], [3] See Table I.
[4] Alkali-resistance is determined in the same manner as water-resistance with the single exception that the puddle is formed of a 5% solution of sodium hydroxide in water.
[5] The 500 gm. Zapon test is a standard test for curing time. The times in minutes indicate the time at which the curing film reaches the same degree of cure as determined by its tackiness.

EXAMPLE 8

This example illustrates the vinylation of safflower oil according to the present invention.

A solution of 400 parts of conjugated vegetable oil (conjugated safflower oil—Baker 122G) and 240 parts of 2-ethoxy ethanol (Cellosolve) was treated to 375° F. in a sealed metal reactor. To the agitated oil solution at 375° F. was added a mixture of 200 parts of methyl methacrylate, 142.4 parts of styrene, 57.6 parts of acrylic acid, and 8 parts of ditertiary butyl peroxide initiator. The monomer-initiator mixture was added in 45 minutes. One hour after the addition was completed, 2 parts of ditertiary butyl peroxide initiator were added to the reaction mixture. The reaction mixture was then heated an additional hour and cooled.

A portion of the reaction mixture was neutralized with triethyl amine and dispersed in water to give a cloudy, opalescent dispersion. A .003" wet film of this dispersion was soft and tacky.

EXAMPLE 9

This example illustrates the synthesis of an alkyd resin which can be vinylated according to the present invention.

Linseed oil (800 g.) and pentaerythritol (73.7 g.) are alcoholized in the presence of litharge catalyst at 445° F. for at least one hour but not longer than two hours. The reaction is cooled to 325° F. whereupon phthalic anhydride (143.8 g.) is added. The reaction mixture is heated to 480° F. until an acid value of 6–10 is reached. The resultant alkyd resin, termed Resin J, has a viscosity of 7.3 stokes at 100% nonvolatile content. Resin J is available commercially under the trademark "Aroplaz 1400" having a viscosity of T–V (Gardner-Holdt).

EXAMPLE 10

This example illustrates the synthesis of yet another alkyd resin which may be vinylated according to the present invention.

Linseed oil (730 g.), phthalic anhydride (192.6 g.) and pentaerythritol (192.6 g.) are reacted together in the manner described in Example 9 to give a resin, termed Resin K, having a viscosity of $Z_2$–$Z_3$ (Gardner-Holdt) at 100% nonvolatile content. This resin is available commercially under the trademark "Aroplaz 1273."

EXAMPLE 11

Resin J (400 g.) and 2-ethoxy ethanol (240 g.), available commercially as Cellosolve, are heated in a sealed reactor to 380° F. A mixture of methyl methacrylate (142.4 g.), styrene (200.0 g.), acrylic acid (57.6 g.), and di-t-butyl peroxide (8.0 g.) are added continuously and uniformly over a 40 minute period while maintaining the temperature between 380° and 400° F. At the end of the aforementioned 40 minute period, the reaction mixture is heated for one-half hour at 400° to 410° F. At the end of this second period, a portion of di-t-butyl peroxide (2 g.) is added to the reaction mixture. Heating is continued for another one-half hour, giving a total reaction time of one hour and 40 minutes, whereupon the reaction mixture is rapidly cooled to room temperature (68° F.). The resultant alkyd resin, termed Resin L, has a nonvolatile content of 74.5%, a viscosity of 17 stokes, and an acid value of 35.4 (47.5 at 100% nonvolatile).

Ammonia is added (4.3 g. of a 28% ammonia solution) to a portion (89.5 g.) of the copolymer solution. Water is then added until the nonvolatile content is 43% giving a clear, slightly viscous solution. A 0015″ wet film of the copolymer modified with emulsifiable cobalt drier solution dried overnight to a Sward hardness of 6. Only a slight spotting of the film was observed after treatment with water for 30 minutes.

EXAMPLE 12

This example illustrates the synthesis of a water-dispersible vinylated alkyd resin according to the present invention.

Resin J (400 g.) and 2-ethoxy ethanol (240 g.) are placed in a sealed reactor and heated to 375° F. Styrene (304 g.), methyl methacrylate (93 g.) acrylic acid (67 g.), and di-t-butyl peroxide (9.3 g.) are added continuously and uniformly during a one hour period while stirring the mixture. The reaction mixture is heated an additional one and one-quarter hours, whereupon an additional amount of di-t-butyl peroxide (2 g.) is added. The reaction mixture is heated another ⅔ of an hour at 375° F., whereupon an additional quantity of di-t-butyl peroxide (2 g.) is added. The reaction mixture is heated yet another ½ hour at 375° F. for a total reaction time of three and one-quarter hours, whereupon the reaction mixture is rapidly cooled to room temperature (68° F.). Analysis of the cooled solution containing vinylated Resin J, termed Resin M, has a nonvolatile content of 81.4%, a viscosity of 52 stokes, and an acid value of 36.7 (45.2 at 100% nonvolatile).

Triethylamine is added to the solution until a pH of 9.5 is reached. Water is then added until the nonvolatile content is 36.4%. The clear solution has a viscosity of 7500 cps. 4/20 (Brookfield).

EXAMPLE 13

This example is illustrative of the synthesis of a vinylated alkyd resin according to the present invention.

Resin K (400 g.) and 2-ethoxy ethanol (280 g.) are placed in a 2-liter reactor and heated to 375° F. Styrene (272 g.) and methyl methacrylate (80 g.), acrylic acid (48 g.), and di-t-butyl peroxide (9 g.) are added to the stirred reaction mixture during a one hour period. The reaction mixture is heated at 375° F. for an additional 2½ hours, whereupon di-t-butyl peroxide (2 g.) is added Heating is continued for an additional one-half hour, making a total reaction time of 4 hours. The reaction mixture is rapidly cooled to room temperature (68° F.). The reaction mixture containing Resin N has a nonvolatile content of 75.7%, an acid value of 25.9 (34.2 at 100% nonvolatile), and a viscosity of 11 stokes.

Triethylamine is added to the above mixture until it has a pH of 9.4. The neutralized resin is added to deionized water. The resultant stable colloidal dispersion has a nonvolatile content of 33.0%, a pH of 9.4, and a viscosity of 2780 cps. 4/50 (Brookfield).

EXAMPLE 14

This example illustrates the synthesis of a water-dispersible vinylated alkyd resin according to the present invention.

Resin J (320 g.) and 2-ethoxy ethanol (240 g.) are placed in a sealed reactor and heated to 375° F. Styrene (342.4 g.), methyl methacrylate (80 g.), acrylic acid (57.6 g.), and di-t-butyl peroxide (8 g.) are added continuously and uniformly over a period of one hour while stirring the reaction mixture. The reaction mixture is heated an additional 1½ hours, whereupon di-t-butyl peroxide (2 g.) is added. After another one hour at 300° to 410° F., an additional portion of di-t-butyl peroxide (2 g.) is added. The reaction mixture is heated an additional 1½ hours at 340° to 360° F., making a total reaction time of 5 hours, whereupon the reaction mixture is rapidly cooled, clear solution containing Resin O gives a nonvolatile content of 79.7%, a viscosity of 62 stokes, and an acid value of 31.8% (40.0% at 100% nonvolatile). The solution containing Resin O is neutralized with triethylamine until the resultant solution has a pH of 9.6. The solution is diluted with water until it has a nonvolatile content of 23.7%. The clear solution has a viscosity of 940 cps. 4/100 (Brookfield) and a pH of 9.6.

EXAMPLE 15

This example, which is not illustrative of the present invention, is set forth for comparison.

The procedure of Example 14 is repeated employing the same reactants and conditions, with the exceptions that the reaction is conducted at atmospheric pressure and the mixture of styrene, methyl methacrylate, acrylic acid, di-t-butyl peroxide is added over a two and one-third hour period. After two additional hours at reflux temperature, di-t-butyl peroxide (2 g.) is added. After an additional one-half hour of reaction time at the reflux temperature, another portion of di-t-butyl peroxide (2. g) is added to the reaction mixture. The reaction solution is heated an additional hour, making a total reaction time of five and two-thirds hours, whereupon the reaction mixture is rapidly cooled to room temperature (68° F.). Upon cooling, the reaction mixture becomes hazy, viscous, and gel-like. The viscosity is unmeasurable but is greater than 400,000 cps. 4/.5 which is the highest value given on the Brookfield Viscosometer. The nonvolatile content is 76.1%.

This gel-like mixture is neutralized with triethylamine. Rapid manual stirring in 2-liters of water at 68° F. fails to disperse the mixture.

EXAMPLE 16

This example illustrates the vinylation of fatty acids according to the present invention.

A solution of 400 parts of a vegetable fatty acid (linseed fatty acid) and 240 parts of xylene are heated to 375° F. in a sealed metal reactor. A solution of 10 parts ditertiary butyl peroxide initiator and 400 parts of styrene are added to the agitated fatty acid-xylene solution. The addition is completed in one hour. The reaction mixture is heated for one hour and an additional 3 parts of ditertiary butyl peroxide are added. The reaction mixture is heated for an additional two hours and cooled to give a styrenated fatty acid product.

Although the invention has been described in considerable detail with reference to certain preferred embodiments thereof, it will be understood that variations and modifications can be effected within the spirit and scope of the invention as described above and as defined in the appended claims.

I claim:

1. A process for producing a water-dispersible vinylated esterification product of a polyol, a polycarboxylic acid and an unsaturated fatty acid or glycerol ester thereof which comprises coreacting said esterification product with a vinyl monomer including at least 5 weight percent of a vinyl carboxylic acid selected from the group consisting of acrylic acid, methacrylic acid and itaconic acid, by the addition of said monomer to the esterification product over a period of not less than one hour at a temperature between 320–450° F. and under at least the autogenous pressure of the reaction system, maintaining said temperature and pressure conditions for not more than 5 hours and thereupon neutralizing the resultant vinylated esterification product with a water-soluble base.

2. The process of claim 1 wherein the base is a primary, secondary, or tertiary amine.

3. The process of claim 2 wherein the amine is triethyl amine.

4. The process of claim 1 wherein the polycarboxylic acid is selected from the group consisting of phthalic and isophthalic acids.

References Cited

UNITED STATES PATENTS

| | | | |
|---|---|---|---|
| 1,975,959 | 10/1934 | Lawson et al. | 260—23 |
| 2,655,488 | 10/1953 | Kanning et al. | 260—23 |
| 2,736,716 | 2/1956 | Lowe et al. | 260—23 |
| 2,928,796 | 3/1960 | Heckles | 260—22 |
| 3,367,894 | 2/1968 | Bruggeman | 260—22 |

FOREIGN PATENTS

| | | |
|---|---|---|
| 711,141 | 6/1954 | Great Britain. |
| 714,432 | 8/1954 | Great Britain. |
| 988,737 | 4/1965 | Great Britain. |

DONALD E. CZAJA, Primary Examiner.

R. W. GRIFFIN, Assistant Examiner.

U.S. Cl. X.R.

117—124, 134, 1395, 167; 260—23, 237, 292, 296, 324, 326, 332, 336